Figure 11:
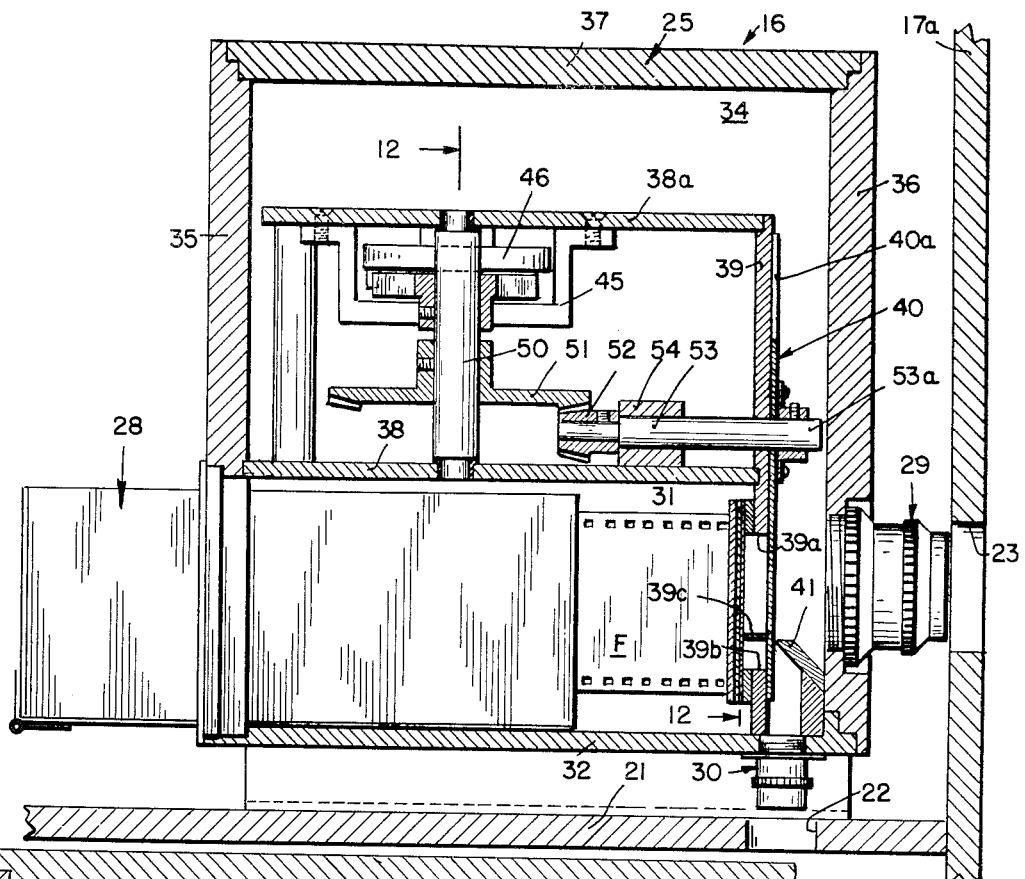

Oct. 25, 1955 — F. WARREN — 2,721,497
PHOTOGRAPHIC REPRODUCTION DEVICES
Filed March 27, 1953 — 4 Sheets-Sheet 1
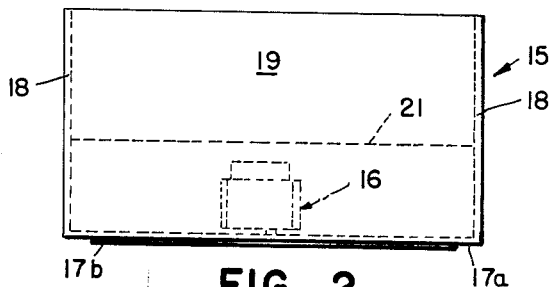
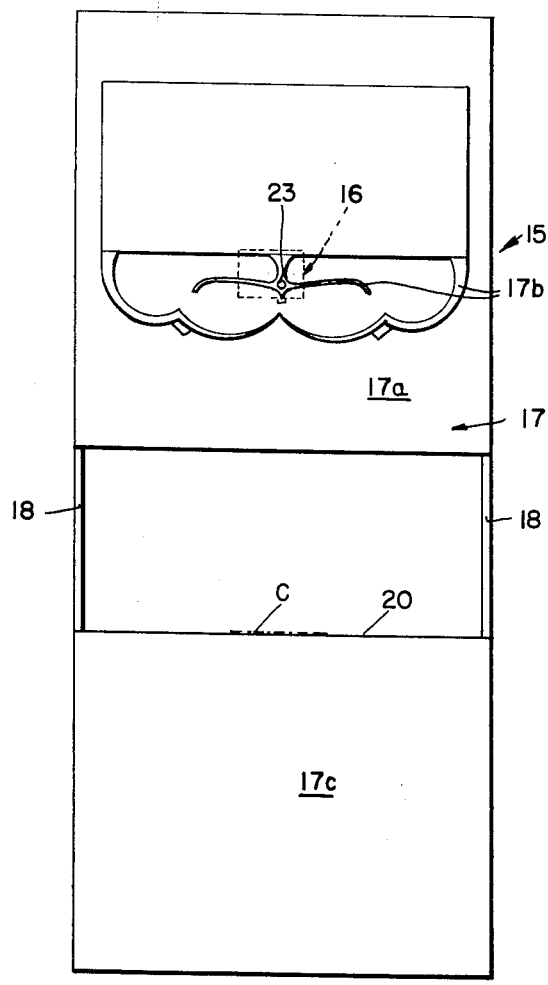
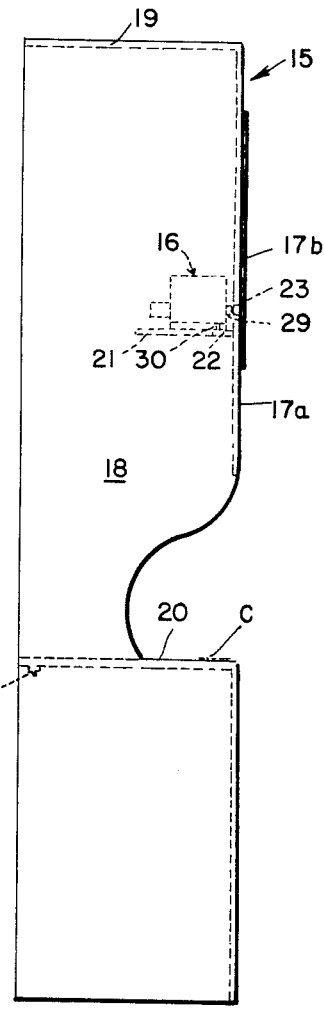
INVENTOR.
FRED WARREN
BY
ATTORNEY Oct. 25, 1955   F. WARREN   2,721,497
PHOTOGRAPHIC REPRODUCTION DEVICES
Filed March 27, 1953   4 Sheets-Sheet 2
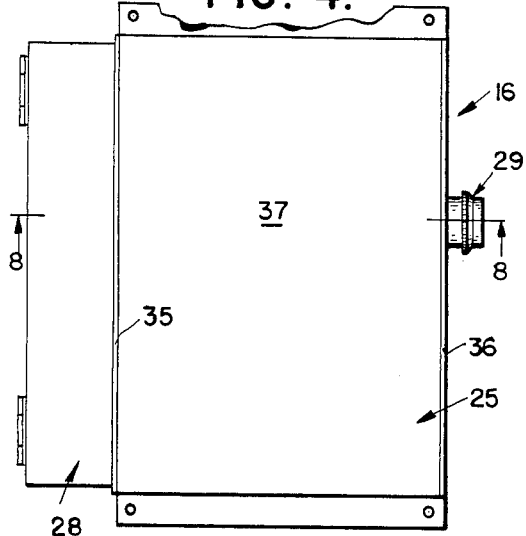
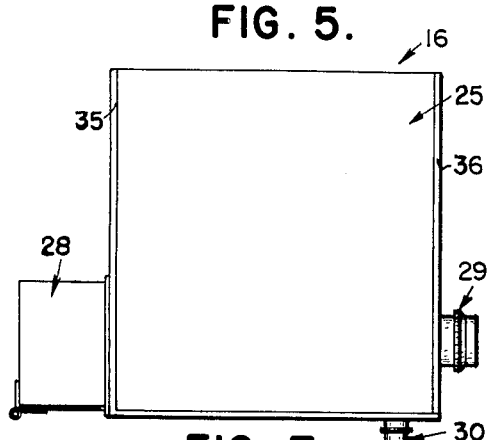
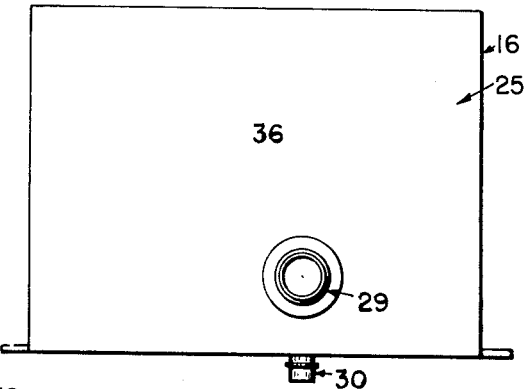
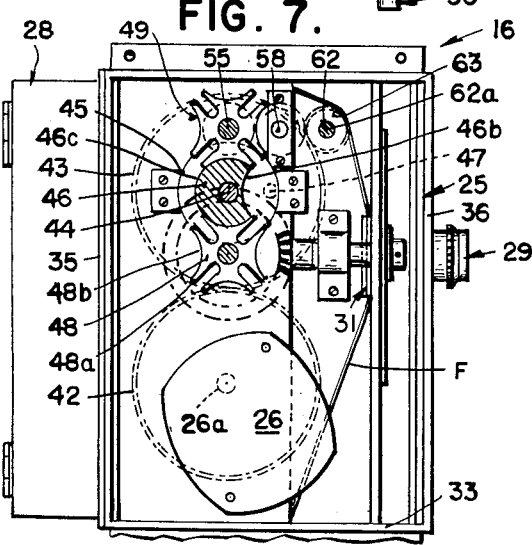
*INVENTOR.*
FRED WARREN
BY
ATTORNEY Oct. 25, 1955   F. WARREN   2,721,497
PHOTOGRAPHIC REPRODUCTION DEVICES
Filed March 27, 1953   4 Sheets-Sheet 3
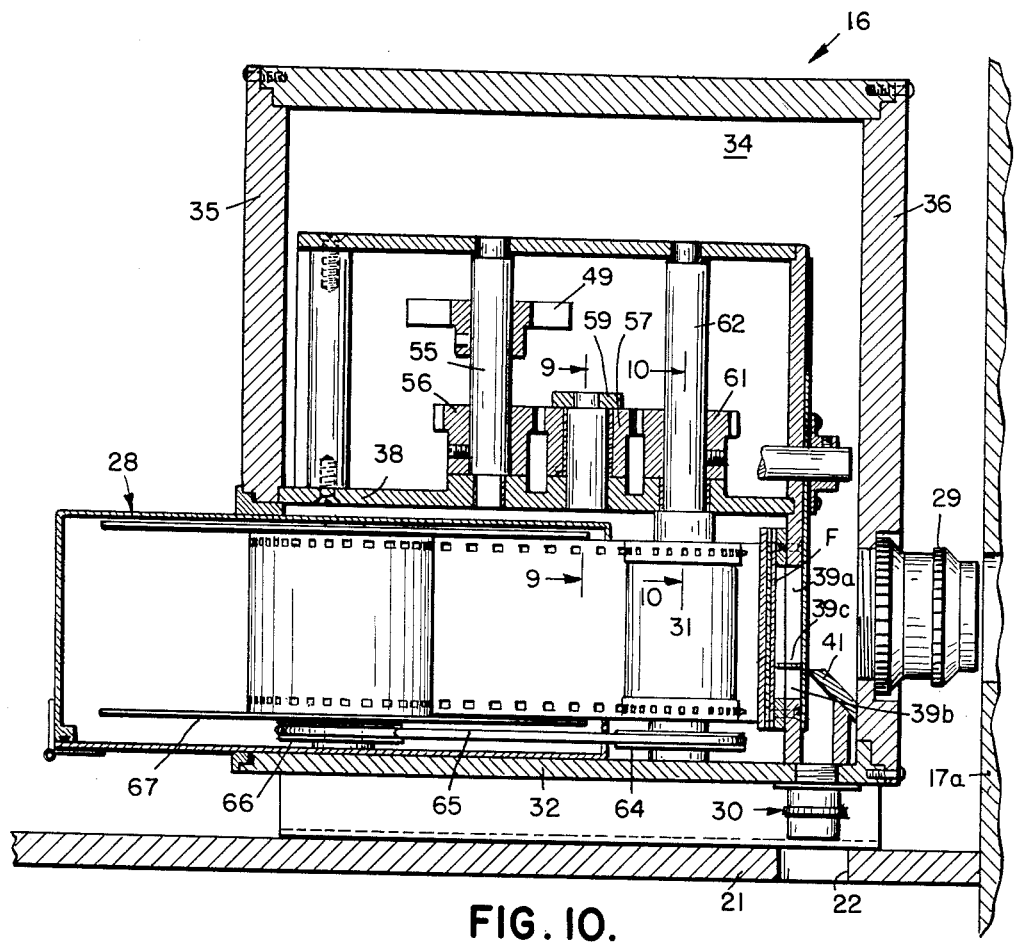
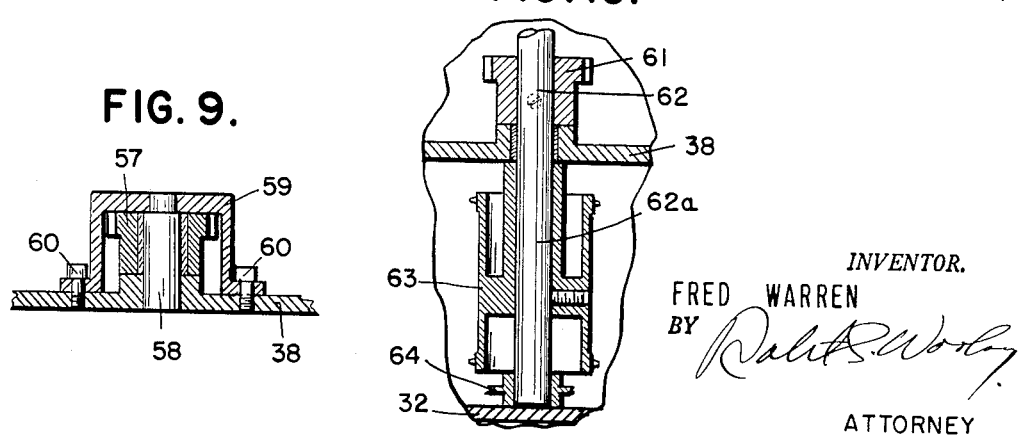
INVENTOR.
FRED WARREN
BY
ATTORNEY Oct. 25, 1955  F. WARREN  2,721,497
PHOTOGRAPHIC REPRODUCTION DEVICES
Filed March 27, 1953  4 Sheets-Sheet 4

INVENTOR.
FRED WARREN
BY
ATTORNEY

United States Patent Office 2,721,497
Patented Oct. 25, 1955

2,721,497
PHOTOGRAPHIC REPRODUCTION DEVICES
Fred Warren, Sunland, Calif.
Application March 27, 1953, Serial No. 344,967
1 Claim. (Cl. 88—24)

This invention pertains to photographic reproduction devices and more particularly to devices which make possible the photographing of a plurality of objects in a plurality of planes, the reproduction of which is simultaneously recorded on a single frame of continuous film.

While the device may be used for purposes other than disclosed in the drawings, the particular arrangement as I have illustrated is best applied to the reproduction on film, the images of a person positioned in front of the device and a check so placed on a portion of the device that both person and check will thus be photographed simultaneously, the person in this case being a payee and the device taking the form of a cashiers booth or cabinet. The prime object being to associate the two subjects as evidence should occasion require.

Further, another object is to provide such means as will perform the photographic function without the knowledge of the said payee, the actual photographic equipment being concealed from view of the payee and the apertures thru which the subjects are viewed by the camera, be made inconspicuous or otherwise concealed so as to obviate the possibility of the payee being aware of their presence.

Another object is to provide simple and inexpensive means for loading and unloading the camera with suitable film cartridges.

Figure 12:
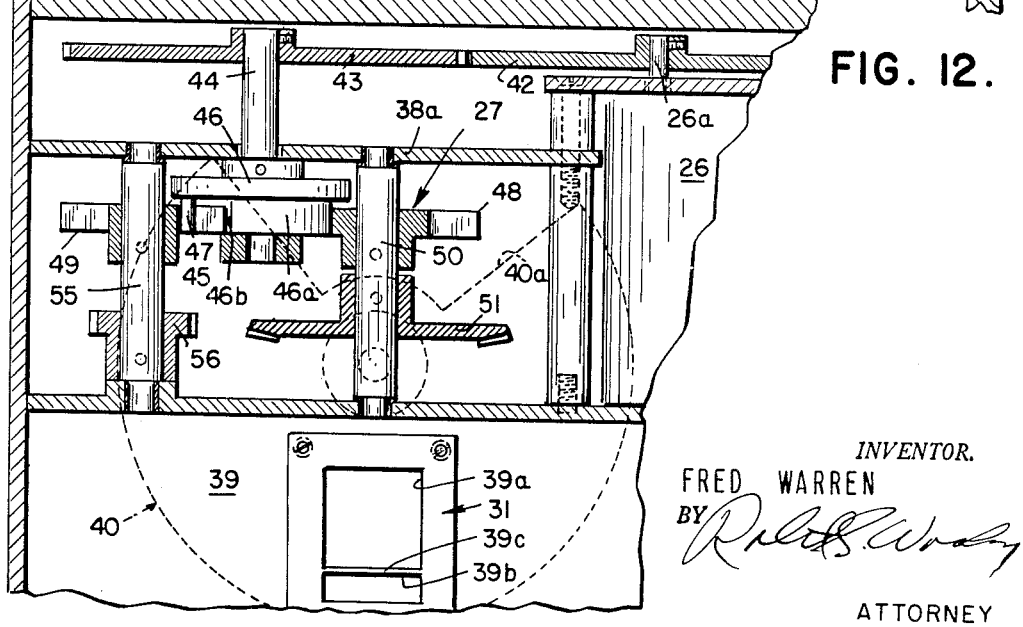

These objects and advantages are fully disclosed in the detailed description of the constituent elements illustrated in the drawings in which:

Figure 1 is a plan view of the device.
Figure 2 is a front elevation of the device shown in Figure 1.
Figure 3 is a side elevation of the same device.
Figure 4 is a plan view of the camera.
Figure 5 is a side elevation of the device shown in Figure 4.
Figure 6 is a front elevation of the same.
Figure 7 is a plan view of the camera but omitting the top cover plate to show the interior, parts being shown in section.
Figure 8 is a fragmentary, vertical sectional view taken along the lines 8—8 of Figure 4, a portion of the cabinet being shown in relation thereto.
Figures 9 and 10 are sectional views taken along the lines 9—9 and 10—10 of Figure 8.
Figure 11 is a vertical sectional view similar to Figure 8 but showing another portion of the driving mechanism.
Figure 12 is a sectional view taken along the lines 12—12 of Figure 11.

Referring to the drawings, the device comprises primarily, a cabinet 15 and the photographic element or camera 16.

The cabinet consists of a front wall 17, the upper portion 17a of which is provided with suitable ornamental scroll or relief paneling 17b. The lower portion 17c of the front wall is preferably plain. Side walls 18, top wall 19 and counter 20 comprise the main structural members, however, drawers, doors, etc. may be added to provide suitable place for articles related to the use of a booth or cabinet for which this device is intended.

A horizontal partition 21 provides a mounting for the camera 16 and an aperture 22 in partition 21 provides means for subject matter positioned on the counter to be viewed by the vertical lense of the camera.

The front wall 17a is provided with an aperture 23 which registers with the horizontal lense of the camera and thus provides means for subject matter positioned in front of the cabinet to be viewed by the camera. The aperture 23 is seemingly a part of the decorative ornamentation 17b and hence inconspicuous to those unaware of its presence as a functional element in the process of photographing subject matter.

A camera control button 24 is shown as being mounted on the underside of the counter 20, however, many suitable means and location of said means may be employed to provide the payor with a convenient control for the camera without its use being apparent to the payee.

The counter may have marked thereon an area in which advantageous position the check C should be placed, obviously tho, such marking should not attract the attention of the payee to the extent of questioning its intent.

The camera proper consists primarily of a housing 25, a motor 26, drive mechanism 27, film magazine 28, horizontal lens element 29 and vertical lens element 30.

Lens elements 29 and 30 may be one of many types of lenses used in connection with the function as required in a device of this nature and hence a detailed description of these elements will not be included in this disclosure.

The film cartridge likewise forms no part of the invention and thus a conventional cartridge may be adapted with little or no alterations.

Further, the pressure plate assembly 31 may be one applicable to the particular film used and since this element also has no special function other than such a device performs, a detailed description will not be included in this disclosure.

The particular arrangement of the two lenses with respect to the aperture controlled by the shutter, the means for directing both the horizontal and vertical lense images to a single frame of a film and, the novel means for intermittently moving the film and rotating the shutter, constitute the important factors now to be described.

The housing 25 consists of a bottom wall 32, end walls 33 and 34, back wall 35 and front wall 36, top wall 37 completing the closure. Within the housing, a partition 38 serves as a means for mounting the motor 26 as well as portions of the drive mechanism. Intermediate partition 38 and the top 37 of the housing is another partition 38a which serves primarily as a bearing plate for several of the shafts of the drive mechanism and, a vertical plate 39 provides a mounting for the pressure plate 31, a rotatable shutter 40 and the prism or mirror 41.

The motor 26 having a shaft 26a, has attached thereto a gear 42 which meshes with a gear 43 fixed to a shaft 44 which is journaled in partition 38a and a bracket 45 mounted on the under side of said partition 38a. Shaft 44 has fixed thereto a Geneva stop wheel 46, said wheel being interposed between the under side of partition 38a and the upper face of the bracket 45. Said wheel 46 is provided with a pin 47 near its periphery, the pin projects longitudinally from the face of the wheel and thus acts as a driving element to rotate slotted stop wheels 48 and 49. The wheel 46 is further provided with a hub portion 46a, the periphery of which is interrupted by an arcuate notch 46b, said notch being provided to clear the outermost ends of the slotted portions 48a of the wheel 48 and similar ends of the wheel 49, when wheels 48 or 49 are rotated by wheel 46.

The concentric portion 46c of the hub 46a is adapted to coact with concave notches 48b in the wheel 48 so that wheel 46 may rotate and simultaneously provide an arresting means for wheel 48. Thus, rotation of wheel 46 will cause pin 47 to engage the slot in portion 48a of the wheel 48, rotating said wheel until pin 47 leaves contact with 48a which in the case illustrated, will be ninety degrees since there are four notches equally spaced around the periphery of the wheel 48. Wheel 48 having been rotated one quarter of a revolution, wheel 46 continues movement but portion 46c of the wheel 46 registers in the concave portion 48b of the wheel 48 and thus arrests rotatable motion of wheel 48. Continuity of rotation of wheel 46 will likewise act on wheel 49 and the rotation of wheel 46 for one revolution, wheels 48 and 49 each having made one quarter of a revolution, completes a cycle such as is required for the device illustrated.

Wheel 48 is fixedly mounted on a shaft 50 which is journaled in plates 38 and 38a, said shaft having also mounted thereon a bevel gear 51 which meshes with a bevel pinion 52 fixed to a shaft 53, said shaft being journaled in a bearing 54 and the wall 39. Shaft 53 has an extension 53a which projects beyond the wall 39 and said extension has attached thereto the shutter 40. Shutter 40 has a V-shaped notch 40a so that when shutter is rotated, said notch registers with apertures 39a and 39b in the wall 39 to permit the passage of light into the interior of the film compartment and thus reproduce the images as viewed thru the lenses 29 and 30 on the film F.

Wheel 49 is fixed to a shaft 55 which is journaled in the plates 38 and 38a, said shaft having also mounted thereon a gear 56 which meshes with an idler pinion 57 mounted for free rotation on a shaft 58 fixedly mounted in the wall 38 and in a bracket 59 mounted on the wall 38 as by screws 60. Pinion 57 meshes with a gear 61 fixed on a shaft 62, said shaft being journaled in plates 38 and 38a. Shaft 62 has an extension 62a and has mounted thereon a film sprocket drum 63 which feeds the film thru the pressure plate for exposure to the image as is common to cameras.

In order to provide suitable winding of the film in the film cartridge, shaft end 62a is further provided with a belt sheave 64 and, by means of a belt 65 and a sheave 66 on the winding drum 67 of the film cartridge element 28, film is transferred from one of the reels in the cartridge, thru the pressure plate and then back to the other film reel in the film cartridge.

Thus, with the motor in operation, wheel 46 first rotates wheel 48 one quarter of a revolution, which by reason of a one to four speed-up ratio of the gears 51 and 52, shutter 40 is rotated one complete revolution, during which it will expose momentarily the film to the images and then come to rest as previously explained. Continuity of the movement of the wheel 46 will, thru gears 56, 59 and 61, cause sprocket 63 to rotate sufficiently to move film a distance equal to the length of one frame. A limit switch, not shown, may be adapted to limit the rotatable movement of the gear 43 to one revolution for each impulse imparted to the switch 24, so that a single frame of film may be exposed with each impulse of said switch.

The exposing of a plurality of objects in a plurality of planes and simultaneously recording such images on a single frame of film is accomplished by the mirror or prism 41 in cooperation with the vertical lens element 30 and the horizontal lens element 29. Aperture 39a is arranged to be in alignment with the focal range of lens element 29 and aperture 39b is so positioned that with the aid of the oblique angled mirror or prism 41, and the lens 30, the image at right angles to the focal centerline of lens 29 will be transferred to the same frame of film as will receive the image as viewed thru lens 30. The partition 39c between the apertures 39a and 39b provide means to keep segregated the two images so that a distinct image of each subject is recorded side by side on the film. I might point out that while I have shown but two angles of focal centerlines, obviously, more than two lines can be incorporated in the arrangement without deviating from the general structure.

With the objects and advantages thus disclosed, I do not desire to be limited to deviations in structure except as may be defined in the appended claim.

I claim:

In a photographic apparatus for photographing a person and his check or the like on a single film strip, comprising a camera including a horizontally directed lens means and a downwardly directed lens means for simultaneously photographing the person and his check or the like, respectively, the novelty comprising a substantially closed cabinet provided with a front panel having a decorative design thereon at approximately normal head height position and normally confronting a person positioned in front thereof, means mounting said camera within said cabinet and behind said front panel, said cabinet having an opening in a lower portion thereof, above which said downwardly directed lens means is mounted in a position to receive light therethrough, a counter in fixed position spaced below said cabinet in alignment with said downwardly directed lens means and said opening for receiving a check thereon to be photographed by said downwardly directed lens means, said cabinet including an opening in said front panel and forming part of said decorative design, said opening being in light-communicating posture between the horizontally directed lens means and said head position, and means on said apparatus for actuating said camera.

References Cited in the file of this patent

UNITED STATES PATENTS

| Number | Name | Date |
|---|---|---|
| 1,094,073 | Ilg | Apr. 21, 1914 |
| 1,143,522 | Faber | June 15, 1915 |
| 1,645,590 | Ernst | Oct. 18, 1927 |
| 2,045,414 | Rumpel | June 23, 1936 |
| 2,125,388 | Monroe | Aug. 2, 1938 |
| 2,160,006 | Thompson | May 30, 1939 |
| 2,169,011 | Wengel | Aug. 8, 1939 |
| 2,180,007 | Hopkins | Nov. 14, 1939 |
| 2,226,364 | Anthony | Dec. 24, 1940 |
| 2,250,442 | Abell | July 29, 1941 |
| 2,273,876 | Lutz | Feb. 24, 1942 |
| 2,420,046 | Loeb | May 6, 1947 |